United States Patent [19]

Starkey

[11] 3,951,433

[45] Apr. 20, 1976

[54] BOAT LAUNCHING MECHANISM

[76] Inventor: John F. Starkey, P.O. Box 419, Clovis, N. Mex. 88101

[22] Filed: Dec. 12, 1974

[21] Appl. No.: 532,222

[52] U.S. Cl. .......................... 280/414 R; 214/85.5
[51] Int. Cl.² ........................................... B60P 3/10
[58] Field of Search ............. 214/85.5, 84; 280/414

[56] References Cited
UNITED STATES PATENTS

| | | | |
|---|---|---|---|
| 3,149,735 | 9/1964 | Bleecker | 214/85.5 |
| 3,175,716 | 3/1965 | Masseria | 214/85.5 X |
| 3,303,952 | 2/1967 | Bissinger | 214/85.5 X |
| 3,363,789 | 1/1968 | Lange | 214/85.5 X |

*Primary Examiner*—Philip Goodman
*Assistant Examiner*—R. Schrecengost
*Attorney, Agent, or Firm*—Cushman, Darby & Cushman

[57] ABSTRACT

A mechanism for launching a boat from a trailer wherein a cable system is removably secured to the bow of the boat and is looped around the rear of the trailer for operative connection to a winch. Upon actuation of the winch a force is directed against the bow of the boat in a direction toward the rear of the trailer, thereby urging the boat in a rearward direction for eventual launching.

4 Claims, 5 Drawing Figures

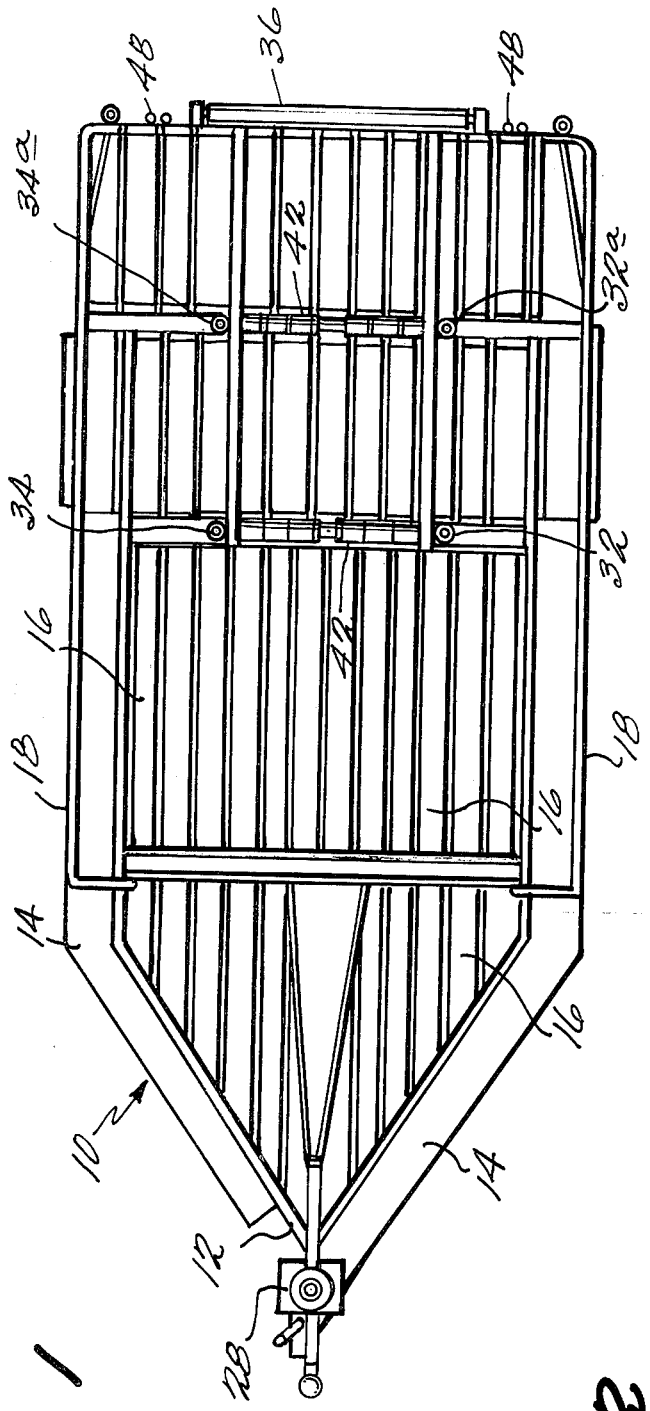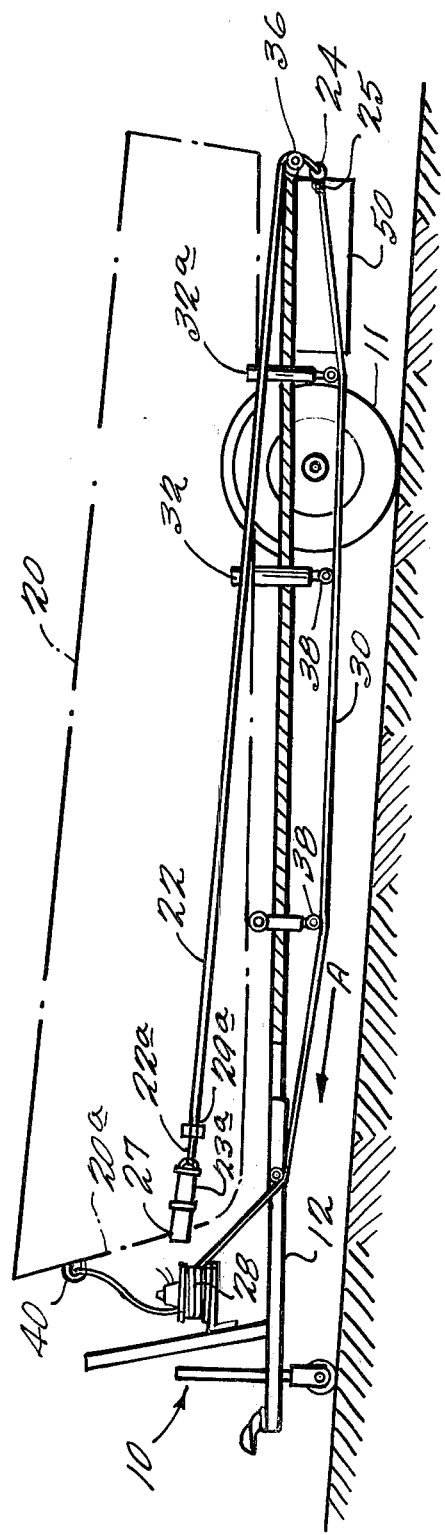

BOAT LAUNCHING MECHANISM

BACKGROUND OF THE INVENTION

A. Field of the Invention

The present invention involves a mechanism used to launch a boat from a boat trailer. More particularly, the present invention discloses a launching mechanism which utilizes a cable system operatively connected to a typical power or hand operated winch. When the winch is activated, cables connected to the bow and the port and stern sides of the boat are drawn toward the rear of the trailer thereby pulling the boat towards the rear for launching.

Boating is a popular sport on the nation's rivers, lakes and offshore areas, and many Americans own small pleasure craft for fishing, water skiing, sightseeing, etc. Most small pleasure craft owners transport their boats by means of relatively small and light trailers, which are pulled by automobiles, pickup trucks or campers. Typical pleasure boats include small rowboats, sailboats, inboard and outboard speedboats and small cabin cruisers. Because the larger pleasure craft may use outboard or inboard engines of substantial weight and horsepower, these pleasure craft may weigh upwards of 1 ton.

A recurring problem arises when a pleasure craft owner seeks to launch a relatively heavy boat from the trailer into a body of water. Typically, the trailer is backed down a ramp into the water unitl the wheels of the trailer are either substantially or completely submerged. However, for the boat to actually float free from the trailer, the trailer must be backed down even further into the water. Most boat owners are hesitant to back the trailer further down into the water because the potential loss of the pulling vehicle due to faulty brakes, etc. is ever present. Once the boat has drawn water, at least at the stern portion thereof, a boat owner unwinds a winch mechanism and the boat will tend to roll off the trailer into the water.

However it is often the case that the boat will not easily roll off the trailer into the water. If the boat is large and heavy a correspondingly large trailer is used which may not be safely backed down into the water a great distance. In this situation, a boat owner must physically push and shove the boat off the back end of the trailer into the water. If a boat owner is an older individual or not very robust, this pushing and shoving of the boat can become extremely exhausting and sometimes it may prove to be impossible to unload the boat.

In view of the foregoing problems, the present invention seeks to eliminate manual pushing and shoving required to launch a boat from a trailer. Rather, the present invention employs a power winch which operatively displaces a cable system which is secured to the bow of the boat. Upon actuation of the powered winch, the boat will be launched from the trailer into the water. An additional feature of the present invention resides in the use of a wind arm for guiding a boat into a boat trailer. Most boat owners are quite familiar with the problem of leading a boat onto a trailer from the water when it is windy. The wind has a tendency to keep the boat out of alignment with the trailer so that the boat may be properly docked or loaded onto the trailer.

B. Description of the Prior Art

It is well known to launch a boat from a trailer by means of a cable reel or winch. A typical cable reel will be fully wound with a cable which is attached to an eyelet or ring on the bow of the boat. With the boat trailer disposed at an angle to the water, the cable reel may be unwound slowly to lower the boat into the water. The supporting rollers on the trailer must be in good repair or else the boat may not readily roll off the trailer into the water.

One such prior art device is disclosed in U.S. Pat. No. 3,447,815. This patent describes a boat centering apparatus in which a cable reel is connected in a conventional manner to an eyelet at the forward end of the boat. However, this patent is generally directed to the object of providing a boat centering apparatus which can be readily mounted on any type of boat trailer for maintaining contact with the sides of the boat during a loading operation to ensure that the boat will be properly centered on the trailer during the loading operation. U.S. Pat. No. 3,447,815 does not describe a mechanism which operatively launches a boat from a trailer, but rather describes the use of a pair of connecting rod members which are arranged on the trailer so as to engage a boat on opposite sides thereof in order to resiliently urge the boat to a centered position with respect to the trailer before loading the boat onto the trailer.

An amphibious boat trailer is disclosed in U.S. Pat. No. 3,530,518. Here, the amphibious trailer is used for launching, docking or transporting a pleasure boat wherein flotation cells are secured to the trailer. The flotation cells float the trailer at a depth sufficient to enable the boat hull to just clear the bed of the trailer and float over the trailer frame without manual maneuvering or lifting from outside the boat. While this patent may at first appear to provide a satisfactory method for launching a boat, it becomes readily apparent that the trailer must be substantially submerged within the water. By substantially submerging or backing a trailer down a steep ramp into the water, there still remains the substantial risk that an automobile which pulls the trailer could inadvertantly become submerged also. U.S. Pat. No. 3,530,518 does not disclose a winch system operatively secured to cables for pulling a boat toward the rear of a trailer during the launching operation.

A further floating boat trailer device is set forth in U.S. Pat. No. 3,124,259. This patent describes a floating boat trailer for launching boats which also serves as a floating boat duck. Specifically, this patent describes the provision of a floating boat trailer which floats in the water adjacent to the shoreline of a waterway whereby the trailer may readily be swung about at various angles to receive a boat adjacent the shoreline, thereby greatly facilitating the alignment of the trailer with the boat as it approaches the shoreline, particularly when loading a boat in the trailer during windy weather conditions. U.S. Pat. No. 3,124,259 also does not employ a powered system for launching a boat from a trailer. While U.S. Pat. No. 3,124,259 contemplates the use of a conventional winch disposed to operate a cable over a cable pulley, there is no disclosure of a winch being used to pull or launch a boat off a trailer and into the water.

SUMMARY OF THE INVENTION

Because of the attendant problems surrounding the launching of a boat from a trailer, it is accordingly an object of the present invention to provide a powered mechanism for launching a boat from a trailer and for loading the boat on to the trailer. The present invention employs an uncomplex winch and cable system for these purposes. A bow plate is constructed to fit over the bow of the boat. Disposed longitudinally along each side of the boat and connected to opposite ends of the bow plate are launching cables which in turn loop around the back of the trailer to a movable cross member.

Secured to the cross member is an eyelet, and a winch cable is connected to the eyelet and runs longitudinally underneath the trailer to a winch. Upon actuation of the winch, which may be electrically powered or manually cranked, the winch cable is wound thereon and the resulting rearward force which is exerted on the bow plate towards the rear of the trailer thereby launches the boat from the trailer, greatly simplifying and easing the launching procedure.

Another object of the present invention is to provide a boat launching mechanism which may be readily adapted to an already existing conventional boat trailer provided with a power or manual winch.

A further object of the present invention is to provide for a boat launching mechanism which substantially ensures that a boat may be launched from a trailer without several persons having to vigorously push and shove the boat from the rear of the trailer.

Yet a further object of the present invention is to provide a boat launching mechanism which will readily launch a boat from a trailer without the trailer having to first be submerged at substantial depths beneath the surface of the water.

Additional objects of the present invention reside in the specific construction of the exemplary apparatus hereinafter particularly described in the specification and shown in the several drawings.

BRIEF DESCRIPTION OF THE DRAWINGS

Novel features of the boat loading and launching mechanism in accordance with the present invention will be more readily understood from a consideration of the following description taken together with the accompanying drawings, in which a certain preferred embodiment is illustrated with the various parts thereof identified by suitable reference characters in each of the views, and in which:

FIG. 1 is a top view of a boat trailer which utilizes the cable system of the present invention;

FIG. 2 is a side view of the trailer shown in FIG. 1 in which a boat is shown with the cable launching mechanism of the present invention secured in place;

DETAILED DESCRIPTION OF THE INVENTION

Figure 3:
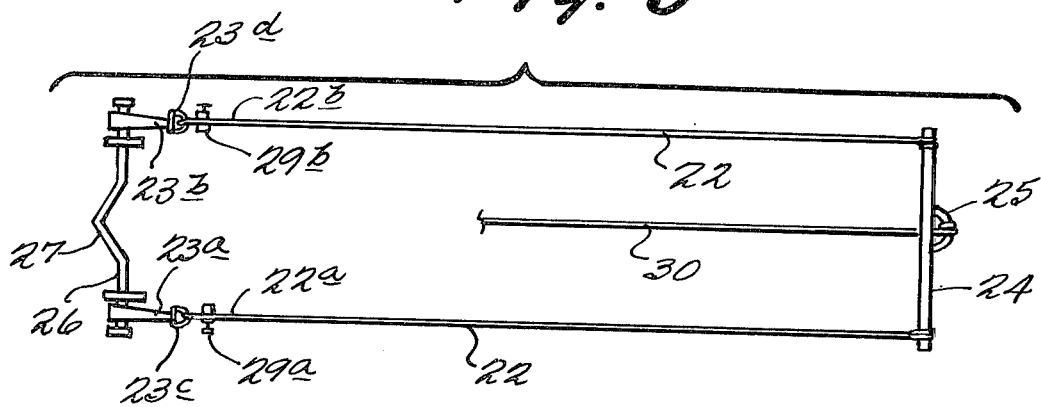
FIG. 3 is a separate view of the cable mechanism viewed from the top.
Figure 4:
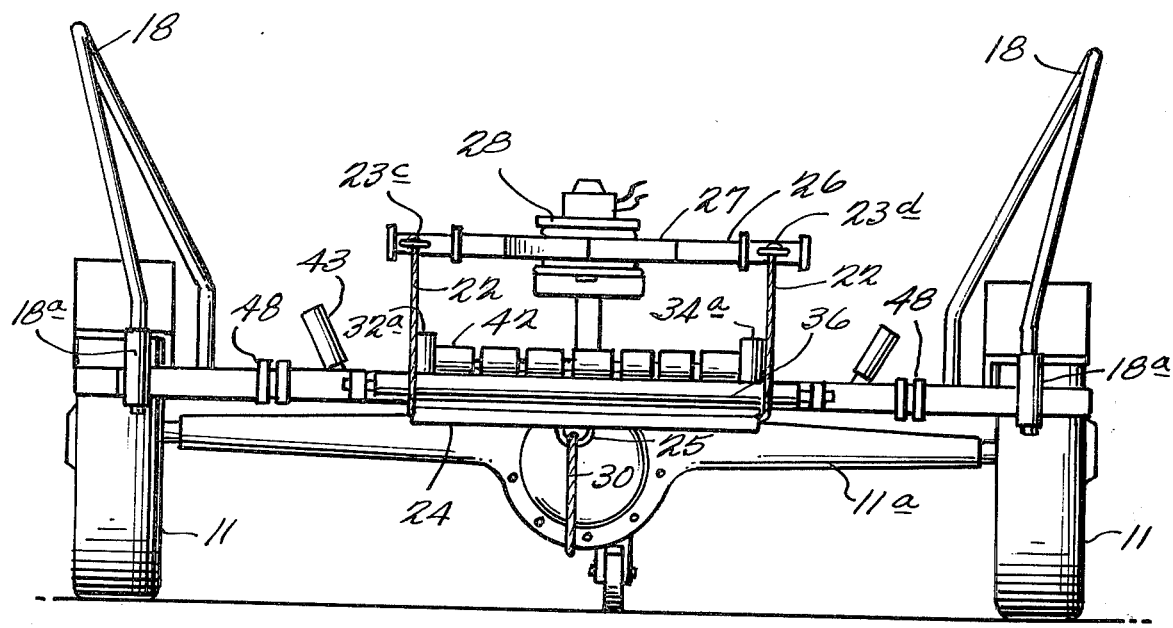
FIG. 4 is a rear view of the trailer and cable launching mechanism and illustrates the approximate position of the cables and bow plate, the boat being deleted for clarity.

With reference to FIGS. 1 and 2 of the drawings, there is illustrated the boat trailer 10 of the present invention. The generally flat trailer 10 has wheels 11 and an axle 11a and is constructed with a metal frame 12. Further included is a platform 14 surrounding the perimeter of the trailer which serves as a walkway to aid in the launching or docking of a boat. The base portion of the trailer 10 is constructed of a plurality of lumber planks 16 secured to the frame by bolts. However, the winch and cable launching system of the present invention is contemplated as being readily adaptable to most typical boat trailers.

A hand rail 18 is also located on the sides of the trailer 10 to aid an individual in climbing onto or off of platform 14. Hand rail 18 may be constructed from pipe stock and arranged to fit interiorly of pipe sleeves 18a. Thus, it can be appreciated that the hand rails 18 may be removed if it is desired to use trailer 10 for purposes other than transporting a boat. In FIG. 2, there is illustrated a boat 20 loaded on the bed of trailer 10. From a consideration of FIGS. 2 and 3, it can be seen that launching cable 22 is inserted through a moveable cross member 24, such as a pipe or bar, wherein cable ends 22a and 22b are secured to opposite ends of a bow plate 26 by means of connecting arms 23a and 23b. Bow plate 26 is constructed with an apexed segment 27 which conforms to the shape of the bow 20a of boat 20. Ends 22a and 22b of the launching cable 22 are threaded through connecting arm eyelets 23c and 23d respectively, and are secured by means of screw clamps 29a and 29b.

Another eyelet 25 is attached to the cross member 24 secured to and extending from eyelet 25 underneath trailer 10 to winch 28 is a winch cable 30. The launching cable 22 extends from bow plate 26 along the outside of the port and starboard sides of boat 20. The launching cable 22 is slidably disposed against cable guards or slides 32, 32a, 34 and 34a. When the bow plate 26 and the launching cable 22 are arranged about boat 20 as shown in FIG. 3, the cross member 24 is disposed beneath and adjacent to rear roller 36. Additional pipe slides 38 are provided as a sliding surface and support for winch cable 30.

A conventional bow eyelet 40 is secured to bow section 20a in order to provide a hook for the winch cable used to pull boat 20 onto trailer 10 during a docking operation.

The launching operation embodying the principles of the present invention will now be described. Preferably, a power winch is used but it is certainly contemplated that a manual crank winch could also be employed. Bow plate 26 is manually placed upwardly against the bow 20a. A certain amount of tension may be applied by the winch 28 to the launching cable 22 and winch cable 30 in order to maintain bow plate 26 against bow 20a. During transport of the boat 20 on trailer 10, it is contemplated that bow plate 26 will be maintained against bow 20a with cables 22 and 30 in position ready for launching.

To launch boat 20, trailer 10 is first backed into the water until boat 20 has drawn some water around the stern. Winch 28 is then activated to wind up winch cable 30 so that winch cable 30 is pulled in the direction designated by A in FIG. 2. Because winch cable 30 is connected to eyelet 25 of the cross member 24 the latter is also pulled towards the bow of boat 20 thereby pulling the launching cable 22 and bow plate 26 in a direction toward the rear of trailer 10. Correspondingly, bow plate 26 exerts a force on bow 20a which pulls boat 20 to the rear and subsequently from trailer 10. Rear pipe roller 36 insures that the launching cable 22 will readily pass over the rear of trailer 10 without binding on the frame.

Additional rubber rollers 42 are rotatably attached to trailer 10 so that when boat 20 is pulled across trailer 10 a minimum amount of sliding friction is involved. Angularly arranged rubber rollers 43 may also be used to aid in the launching.

After boat 20 has been pulled approximately two-thirds off of trailer 10, bow plate 26 will become detached from bow 20a. At this point, boat 20 is sufficiently launched from trailer 10.

Figure 5:
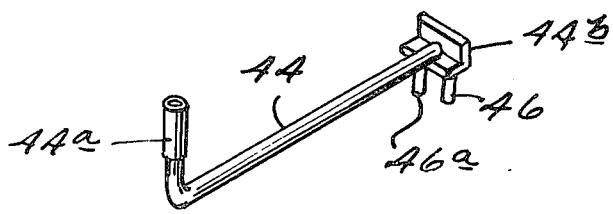
FIG. 5 is an illustration of a wind arm which may be secured to the rear of the trailer in order to properly align a boat before docking the boat onto the trailer.

A further feature of the present invention is illustrated in FIG. 5 which shows a generally L-shaped wind arm 44. Wind arm 44 is provided at one end thereof with a rubber roller 44a. At the other end thereof, a piece of angle iron 44b is welded to wind arm 44. Angle iron 44b has two insert pegs 46 and 46a which are inserted into wind arm assembly pipe sleeves 48 secured to frame 12 adjacent to end roller 36. With wind arm assembly 44 engaged within sleeves 48, trailer 10 may be readily aligned with boat 20 during a docking operation. Wind arm 44 provides a means for manually moving trailer 10 in a lateral direction when it is in the water. Another wind arm construction would employ wind arm 44 inserted into a sleeve secured to hand rail 18. This type of wind arm would not require the insert pegs 46 and 46a and angle iron 44b. A pin securing means would be disposed through a hole in the wind arm and the sleeve to thereby secure the wind arm therewithin. Additionally trailer 10 may be provided with a floatation cell or block 50 of cork or foam so that trailer 10 may float.

The launching cable 22 and winch cable 30 are braided steel cables of, for instance, ¼-inch round diameter. The frame 12 is constructed of welded or bolted metal or steel frame members and the pipe sleeves are metal pipes having diameters sized according to requirements of a particular trailer. While the preferred embodiment contemplates the use of a 6 volt or 12 volt powered winch, a hand crank winch could also be used.

While the invention has been particularly shown and described with reference to the foregoing preferred embodiment, it will be understood by those skilled in the art that other changes in form and detail may be made therein without departing from the spirit and scope of the invention as defined in the appended claims.

What is claimed is:

1. For use on a trailer, a mechanism for launching a boat from the trailer comprising: a winch disposed on a frontal portion of the trailer; a winch cable adapted to be wound up by said winch, said winch cable extending longitudinally of the trailer and having a free end; a cross member extending transversely of the trailer; means for releasably connecting said free end of said winch cable to said cross member; a bow plate for engaging the bow of a boat supported on the trailer; a roller carried by the rear portion of the trailer; and launching cable means including first and second sections extending from said cross member over said roller and connected to said bow plate.

2. In a boat trailer having a wheeled bed and boat supporting means carried by said bed for supporting a boat from the undersurface thereof: a winch mounted on the trailer near the forward end thereof; a winch cable extending from said winch toward the rear end of and beneath the trailer and terminating in a free end; launching cable means including bow-engaging means and a pair of cable sections extending above the body of said trailer rearwardly from said bow-engaging means so as to be capable of extending longitudinally along opposite sides of a boat supported on said supporting means, said cable sections being looped over guide means near the rear end of the trailer and passing forwardly under said trailer bed; and means disposed under said trailer body releasably connecting said cable sections to the free end of said winch cable.

3. Apparatus as in claim 2 wherein said releasable connecting means includes a rigid cross member extending transversely of said trailer, said launching cable sections cooperating with the opposite ends of said cross member and the free end of said winch cable being releasably connected to said cross member intermediate its ends.

4. Apparatus as in claim 2 wherein said guide means includes a roller mounted transversely of the trailer bed at the rear end thereof.

* * * * *